United States Patent
Jeong et al.

(10) Patent No.: US 10,287,404 B2
(45) Date of Patent: May 14, 2019

(54) POLYMER PARTICLE, MANUFACTURING METHOD THEREOF, AND SEPARATOR FOR BATTERY COMPRISING THE SAME

(71) Applicant: LG CHEM., LTD, Seoul (KR)

(72) Inventors: Woong Chan Jeong, Daejeon (KR); Jae Hoon Choe, Daejeon (KR); Hyun Ju Kim, Daejeon (KR); Jong Min Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 246 days.

(21) Appl. No.: 14/915,545

(22) PCT Filed: Jun. 15, 2015

(86) PCT No.: PCT/KR2015/006025
§ 371 (c)(1),
(2) Date: Feb. 29, 2016

(87) PCT Pub. No.: WO2015/190899
PCT Pub. Date: Dec. 17, 2015

(65) Prior Publication Data
US 2016/0215106 A1    Jul. 28, 2016

(30) Foreign Application Priority Data
Jun. 13, 2014    (KR) ........................ 10-2014-0072323

(51) Int. Cl.
*B01D 9/00*    (2006.01)
*C08J 3/12*    (2006.01)
(Continued)

(52) U.S. Cl.
CPC .............. *C08J 3/14* (2013.01); *B01D 9/0054* (2013.01); *B01D 9/0059* (2013.01); *C08J 3/12* (2013.01);
(Continued)

(58) Field of Classification Search
CPC ................ B01D 9/0054; B01D 9/0059; B01D 2009/0086; C08J 3/12; C08J 3/14; C08J 2323/06; H01M 2/1653; H01M 10/0525
(Continued)

(56) References Cited

U.S. PATENT DOCUMENTS 5,989,698 A * 11/1999 Mrozinski .......... B01D 67/0088
428/315.7
6,051,618 A *  4/2000 Tabaksblat ................. C08J 9/28
521/60
(Continued)

FOREIGN PATENT DOCUMENTS

CN    1265690 A    9/2000
CN    1986609 A    6/2007
(Continued)

OTHER PUBLICATIONS

Lee et al., Machine translation of KR 20030075072 A, Sep. 2003 (Year: 2003).*
(Continued)

*Primary Examiner* — Sean P Cullen
(74) *Attorney, Agent, or Firm* — Dentons US LLP

(57) ABSTRACT

The present application relates to a polymer particle manufacturing method, and according to an example of the manufacturing method and a manufacturing apparatus therefor, a reduction in energy can be achieved by simplifying a manufacturing process thereof.

11 Claims, 5 Drawing Sheets

(51) Int. Cl.
*C08J 3/14* (2006.01)
*H01M 2/16* (2006.01)
*H01M 10/0525* (2010.01)
*H01M 10/052* (2010.01)

(52) U.S. Cl.
CPC ..... *H01M 2/1653* (2013.01); *H01M 10/0525* (2013.01); *B01D 2009/0086* (2013.01); *C08J 2323/06* (2013.01); *H01M 10/052* (2013.01)

(58) Field of Classification Search
USPC .......................................... 429/254; 523/223
See application file for complete search history.

(56) References Cited

U.S. PATENT DOCUMENTS

| | | | |
|---|---|---|---|
| 8,319,916 B2 | 11/2012 | Matsumoto et al. | |
| 2011/0020647 A1* | 1/2011 | Makita | C08J 3/03 |
| | | | 428/402 |
| 2011/0263730 A1 | 10/2011 | Aridomi et al. | |
| 2012/0237771 A1* | 9/2012 | Akasaka | C08G 73/14 |
| | | | 428/402 |
| 2013/0130123 A1 | 5/2013 | Kaneda et al. | |

FOREIGN PATENT DOCUMENTS

| | | | |
|---|---|---|---|
| CN | 101400742 A | | 4/2009 |
| CN | 103069612 A | | 4/2013 |
| JP | 46025625 B | * | 7/1971 |
| JP | 2006-139978 A | | 6/2006 |
| KR | 10-2003-0075072 A | | 9/2003 |
| KR | 10-2003-0075457 A | | 9/2003 |
| KR | 110-2005-0035105 A | | 4/2005 |
| KR | 10-2011-0097758 A | | 8/2011 |
| KR | 10-2013-0097714 A | | 9/2013 |

OTHER PUBLICATIONS

Seitetsu Kagaku Co Ltd, Machine Translation of JP-46025625-B, Jul. 1971 (Year: 1971).*

Matsuyama, et al.: "Formation of polypropylene particles via thermally induced phase separation", Polymer, Elsevier Science Ltd., vol. 41, No. 24., Nov. 30, 2000, pp. 8673-8679.

* cited by examiner

--PRIOR ART--

--PRIOR ART--

POLYMER PARTICLE, MANUFACTURING METHOD THEREOF, AND SEPARATOR FOR BATTERY COMPRISING THE SAME

This application is a 35 USC § 371 National Stage entry of International Application No. PCT/KR2015/006025 filed on Jun. 15, 2015, and claims priority to Korean Application No. 10-2014-0072323 Jun. 13, 2014, which are hereby incorporated by reference in their entireties as if fully set forth herein.

TECHNICAL FIELD

The present application relates to a manufacturing method of polymer particles and a manufacturing apparatus therefor.

BACKGROUND ART

Polymer particles, such as polyethylene particles, have been used in various industrial fields such as a material for separators in a lithium-ion battery. Although the polymer particles can be synthesized by various methods, high manufacturing expenses and environmental pollution have remained as important problems in manufacturing the polymer particles. Therefore, there has been a demand for the polymer particle manufacturing process process that is more energy- and cost-efficient, and environmentally friendly. Also, for the process to be widely applicable in various industrial fields, there has been a demand for the process capable of accurately controlling the average diameter of the polymer particles.

Conventional polymer particle manufacturing processes are carried out with the need to heat the mixture solution of a good solvent in which a polymer is dissolved and a non-solvent in an excessive amount, to or above the melting point of the polymer. That is, in the conventional manufacturing processes, not only the good solvent but also the non-solvent is heated to or above the melting point of the polymer, leading to an increase in the operating and fixed costs of the process, and a difficulty in achieving standardization of a manufacturing process and mass-production.

FIG. 1 and FIG. 2 are the diagrams illustrating examples of conventional polyethylene manufacturing processes.

In the manufacturing process shown in FIG. 1, for example, both a good solvent in which low-density polyethylene is dissolved, such as dodecanol in which low-density polyethylene is dissolved, and a non-solvent are heated to or above the melting point of the polyethylene and subsequently cooled, and during the cooling, a dense emulsion is produced through inducing phase separation between the good solvent and the non-solvent, and polyethylene is produced through inducing crystallization within the emulsion. In this process, in order to induce the temperature-dependent emulsification, it is required that the good solvent and non-solvent are not miscible at low temperatures but miscible at higher temperatures, and examples of such a non-solvent may include ethylene glycol, diethylene glycol, and triethylene glycol. Also, polyethylene particles can be obtained by filtering the crystal solution resulted from the crystallization using a filteration device, after which the residual solvent and non-solvent in the polyethylene are completely removed using a washing solvent such as hexane, acetone and ethanol. However, as previously discussed, manufacturing processes like the one illustrated in FIG. 1 is likely to have the disadvantage of a high operating cost, because the process requires heating of both the good solvent and non-solvent to or above the melting point of polyethylene.

Also, the manufacturing process illustrated in FIG. 2 is similar to the emulsion crystallization process of the manufacturing process illustrated in FIG. 1, except that the emulsion crystallization is carried out using a continuous reactor, more particularly, a microreactor. However, both processes have the disadvantages in that they require costly manufacturing facilities and are difficult to adapt to mass-production, and further, the concentration of polymer in solvents needs to be maintained relatively low, because the narrow channels of a micromixer are prone to clogging due to rapid crystallization of a polymer inside the channels of a microreactor.

DISCLOSURE

Technical Problem

The present application aims to provide a manufacturing method of polymer particles and a manufacturing apparatus thereof.

Technical Solution

The present application claims the benefit of priority based on Korean Patent Application No. 10-2014-0072323, filed on Jun. 13, 2014, and the contents of the above referenced Korean Patent Application is hereby incorporated in their entirety by reference.

The present application relates to a manufacturing method of polymer particles. This exemplary manufacturing method allows the production of polymer particles with lower cost than the conventional methods. For example, according to the manufacturing method described in the present application, polymer particles can be produced by heating only a good solvent in which the polymer particles are dissolved to a high temperature, and the crystallization and washing of the polymer particles can be carried out simultaneously. As such, the manufacturing process can be simplified and the cost of manufacturing can be reduced.

Hereinbelow, a manufacturing method of polymer particles and a manufacturing apparatus thereof according to the present application will be discussed with reference to the drawings, however, the accompanied drawings are merely illustrated for the purpose of description, instead of imposing any constraints or limitations on the manufacturing method and apparatus of the present application.

The polymer particle manufacturing method of the present application includes mixing a first polymer solution which is at a temperature equal to or above the melting point of the polymer and includes a polymer dissolved in a first solvent with a second solvent. The term "mixing" or "to mix" is considered to be identical in meaning and refers to a mixing process used hereinafter. In one example, the mixing process is carried out after a heating process in which the first polymer solution is heated to or above the melting point of the polymer. The heating process according to the present application, requires heating only the first polymer solution in which the polymer is dissolved in the first solvent to or above the melting point of the polymer, and therefore leads to a reduction in the energy consumed for heating, compared to the conventional manufacturing method that requires heating both the good solvent in which polymer is dissolved and the non-solvent in which polymer isn't soluble to high temperatures. The heating of the first polymer solution may be carried out at a temperature, for example, 5° C. to 80° C. higher than the melting point of the polymer, or more preferably, at a temperature 10° C. to 60° C. higher than the melting point of the polymer.

The first solvent may be a good solvent for a particular polymer. The "good solvent" here refers to a solvent that readily dissolves the molecules of a solute or to a solvent that turns transparent or light-penetrable with no or little coloration, nonopaque and uniform within 24 hours after it has polymerized the monomers of the solute or is brought into contact with the polymer solid at room or an elevated temperature, while stirring. The good solvent used in the present application refers to a solvent having the Hansen relative energy difference, with respect to the polymer at room temperature, of 0.6 or more and less than 2, preferably 0.8 or more and less than 1.8, or more preferably, 0.9 or more and less than 1.45. In the ranges of the Hansen relative energy difference cited above, the polymer readily dissolves in the first polymer solution within an appropriate temperature range, leading to reduction in the operating cost and also, the first polymer solution and the second polymer solution have compatibility that will discussed hereinafter, which facilitates the crystallization of the polymer during cooling without forming an emulsion, leading to an increase in the yield of polymer particles.

The Hansen relative energy difference (RED) is defined as the following.

$$RED = R_a/R_0$$

If the RED value is greater than 1, the polymer does not dissolve in the solvent, if the RED value is equal to 1, the polymer partially dissolves in the solvent, and if the RED value is less than 1, the polymer completely dissolves in the solvent. In the above equation, $R_0$ is defined as the interaction radius, and is determined by a specific type of polymer. Also, $R_a$ is defined by the following equation.

$$(R_a)^2 = 4(\delta_{d2}-\delta_{d1})^2 + (\delta_{p2}-\delta_{p1})^2 + (\delta_{h2}-\delta_{h1})^2$$

$R_a$ is defined as a distance between Hansen parameters in the Hansen space, and calculated from the Hansen parameters $\delta_d$, $\delta_p$, and $\delta_h$ as shown above. The unit of these three Hansen parameters is $MPa^{0.5}$, and in the above equation, $\delta_d$ is defined as the energy from dispersion forces between molecules, $\delta_p$ is defined as the energy from dipolar intermolecular forces between molecules, and $\delta_h$ is defined as the energy from hydrogen bonds between molecules.

The polymer may be any type of polymer that can form particles, such as a polyolefin, for example, polyethylene, polypropylene and more preferably, polyethylene manufactured via metallocene catalysis.

In one example, the polymer content of the first polymer solution may range from 0.1 to 10 weight %, for example, 0.1 to 7 weight %, 0.2 to 5 weight %, 0.3 to 3 weight %, and more preferably, 0.5 to 2 weight %. If the polymer content is less than 0.1 weight %, the resulting polymer particles would be too small to be collected, whereas if the polymer content is more than 10 weight %, it is likely to lead to the formation of aggregates among polymer particles formed during the crystallization and result in excessive viscosity of the first polymer solution that renders handling difficult when mixing with the second solvent.

The mixing process described above is an operation in which the heated first polymer solution is mixed with the second solvent, and may be carried out after, or at the same time with heating of the first polymer solution.

The second solvent may be a non-solvent with respect to the polymer. The "non-solvent" here refers to a solvent that does not readily dissolve the molecules of a solute or to a solvent that does not turn transparent or light-penetrable with no or little coloration, nonopaque and uniform within 24 hours after it has polymerized the monomers of the solute or is brought into contact with the polymer solid at room or an elevated temperature, while stirring. The non-solvent used in the present application refers to a solvent having the Hansen relative energy difference, with respect to the polymer at room temperature, of more than 2, preferably more than 2.2, or more preferably, more than 2.3. An upper limit of the Hansen relative energy difference may be less than 5, or preferably less than 3.5, or more preferably less than 2.7. In the ranges of the Hansen relative energy difference cited above, the first polymer solution and a second polymer solution would have the compatibility that will be discussed below, which facilitates the crystallization of polymer during the cooling process without forming an emulsion, leading to an increase in the yield of polymer particles.

The second solvent may be a solvent that has compatibility with the first solvent. As such, the first polymer solution including the second solvent and first solvent are miscible at a temperature equal to or below the crystallization temperature of the polymer. Also, since the first solvent and the second solvent can be uniformly mixed at or below the crystallization temperature, it is possible to obtain the polymer particles through crystallization during the cooling process, without an emulsion being formed due to a polarity difference between the first and the second solvents. Further, in the event that the produced polymer particles are polyethylene or polypropylene or the like, since polyethylene or polypropylene are composed of only hydrocarbons, their surface tends to be hydrophobic, therefore the produced polyethylene or polypropylene particles settle down on the bottom, which could make it easier to collect the produced polymer particles from the mixture solution. The expression "to have compatibility" as used herein refers to obtaining a homogenous mixture, or a mixture in which the above materials do not separate when two or more materials are mixed with each other.

For the first solvent and the second solvent to have compatibility, a monovalent alcohol may be used as the first solvent, and a monovalent alcohol or ketone may be used as the second solvent. For example, for the mixing process, a mixture solution may be obtained from mixing the first polymer solution containing the first solvent which is a monovalent alcohol, with the second solvent which is a monovalent alcohol or ketone. In this case, as previously discussed, the first solvent and the second solvent are miscible at low temperatures, which makes it possible to obtain the polymer particles during the crystallization without forming an emulsion, and furthermore, since the surface of the produced polymer particles tends to be hydrophobic, the particles settle down on the bottom, leading to ease of separation of the produced particles from the solvents.

The first solvent is a good solvent with respect to the polymer, and may be any monovalent alcohol that has compatibility with the second solvent. The lower limit of the number of carbons that the monovalent alcohol can have as the first solvent may be 6 or more carbons, 8 or more carbons, or 10 or more carbons, and the upper limit of the same may be 20 carbons or less, 18 carbons or less, or 16 carbons or less. For example, the monovalent alcohol as the first solvent may be at least one selected from the group consisting of dodecanol and decanol, and more preferably, it may be dodecanol. Also, the second solvent may be any monovalent alcohol or ketone, which can be used as a washing solvent for manufacturing polyolefin particles, and compatible with the first solvent at or below the crystallization temperature. The lower limit of the number of carbons that the second solvent can have, which is a monovalent alcohol or ketone, may be one carbon or more, or two carbons or more, and the upper limit of the same may be 5 carbons or less, or 4 carbons or less. For example, the second solvent may be one selected from the group consisting of ethanol, methanol, and acetone, but more preferably, it may be ethanol. As such, in the case where the washing solvent is used as the second solvent and mixed with the first polymer solution, the crystallization of polymer particles and the removal of the residual solvent can be achieved simultaneously. That is, more economical manufacture of polymer particles can be achieved by carrying out the crystallization of polymer particles and washing of the same simultaneously during the mixing of the first polymer solution and the second solvent, and thereby eliminating the need for a separate washing operation after the crystallization. However, the examples of the present application are not limited by the types of solvents cited above to be used as the first solvent and the second solvent.

As shown in an embodiment of the manufacturing method of the present application, the temperature of the second solvent may be adjusted to or below the crystallization temperature of the polymer. This temperature adjustment may be performed before, or after, or at the same time with the mixing operation. The polymer particles can be produced without forming an emulsion by adjusting the temperature of the second solvent to or below the crystallization temperature of the polymer, preferably in the range of $(T_b-70)°$ C. to $T_b°$ C., more preferably in the range of $(T_b-50)°$ C. to $T_b°$ C., more preferably in the range of $(T_b-30)°$ C. to $T_b°$ C., or most preferably in the range of $(T_b-70)°$ C. to $(T_b-10)°$ C. Here $T_b$ is defined as a melting point (unit: ° C.) of the second solvent. As such, since the temperature of the mixture of the first polymer solution and the second solvent is determined by the temperature of the second solvent, by adjusting the temperature of the second solvent, it is possible to control the size of the particle diameter of the polymer particles to manufacture. In one example, during the mixing process, the second solvent whose temperature is adjusted to or below the crystallization temperature may be mixed with the first polymer solution, and during the mixing as the first polymer solution is mixed with the second solvent, the first polymer solution whose temperature was initially at or above the melting point of the polymer, may cool down. The mixture solution of the first polymer solution and the second solvent is then able to form a nucleus, and as the formed nucleus grows into a crystal, the polymer that was dissolved in the first polymer solution may crystallize and form the polymer particles. Also, the crystallization rate and the particle diameter may be controlled through cooling down the temperature of the mixture solution of the first polymer solution and the second solvent. In this case, the temperature of the mixture solution can be adjusted to the range of $(T_b-35)°$ C. to $T_b°$ C., preferably $(T_b-30)°$ C. to $T_b°$ C., more preferably $(T_b-30)°$ C. to $(T_b-5)°$ C. Here $T_b$ is the boiling point (unit: ° C.) of the second solvent. Adjusting the temperature of the mixture solution to the temperature range cited above may inhibit aggregation of the polymer particles, improve the yield of the polymer particles, and reduce the operating cost. Particularly, the lower limit of the temperature of the mixture solution can be selected, depending on the desired type and desired particle diameter of the polymer particle, in consideration of that the average diameter of the polymer particles tends to increase with an increased temperature of the mixture solution. In one example, if the polymer particles to manufacture are spherical polyethylene particles, a temperature of the mixture solution may be adjusted to the range of 60 to 80° C., for example, 65 to 80° C., 70 to 80° C. or, 70 to 78° C. By adjusting the temperature of the mixture solution to the range cited above, the optimal operation conditions to manufacture spherical polyethylene particles can be achieved in terms of the nucleation rate and crystal growth.

In the manufacturing method described in the present application, the particle size distribution and morphology of the polymer particles can be controlled by carefully controlling the crystallization condition of the polymer during the mixing process, or during the process in which the mixture solution of the first polymer solution and the second solvent is cooled down to or below the crystallization temperature. In one example, through carefully controlling a temperature of the second solvent and/or a temperature of the mixture solution of the first polymer solution and second solvent, it is possible to accurately control the average diameter of the polymer particles formed by crystallization. For example, as described above when polymer particles are manufactured through adjusting the temperature of the mixture solution of the first polymer solution and the second solvent or the temperature of the second solvent, it is possible to increase the average diameter of the polymer particles being formed by increasing the temperature of the mixture solution of the first polymer solution and the second solvent accommodated in the crystallization unit, therefore, the average diameter of the polymer particles according to the present application can be accurately controlled.

The present application also relates to polymer particles manufactured by the manufacturing method discussed above. The polymer particles may have an average diameter in the range of 30 nm to 1 μm, more preferably 65 nm to 700 nm, or most preferably 100 nm to 400 nm, and may have the coefficient of variation (C.V.) adjusted to 60% or less, for example, to the range of 20% to 60%, 20% to 50%, 10% to 60%, or 20% to 50%. By adjusting the average diameter and C.V. of the polymer particles to the range cited above, a separator having the porosity and pore size suitable for lithium-ion batteries may be prepared.

The term "coefficient of variation" refers to a value, expressed as percentage, obtained by dividing the standard deviation of the particle diameters by the average diameter of the polymer particles, and C.V. values allow for assessing the degree of dispersion in diameters of the polymer particles, regardless of the actual size of the polymer particle. That is, the greater C.V. value indicates greater differences in the sizes between polymer particles whereas the smaller C.V. value indicates smaller differences in the sizes between polymer particles and more uniform distribution in the diameters of polymer particles. Since the smaller C.V. value indicates the more uniform distribution in the diameters of polymer particles, in the present application there is no lowest limit determined for the C.V., however, in consideration of manufacturability, it may be 10% or more, or 20% or more.

The present application relates also to a separator for batteries, prepared using the polymer particles discussed above. The separator may be prepared by coating the spherical polymer particles having the average size and C.V. value within the range cited above on a substrate material. When preparing the separator by using the polymer particles manufactured according to the present application, the separator may be prepared to have an average pore diameter in the range of 0.05 μm to 2 μm, more preferably 0.08 μm to 1.5 μm, or most preferably 0.1 μm to 1 μm. Having the average pore diameter in the range cited above, the separator can function as an insulator of a negative electrode and a positive electrode of the battery and allow good ion flow between them, and also can readily provide a shut down function, of blocking the pores by the separator partially being fused in the case of heat generation past a certain level in the battery, resulting in the termination of ionic flow.

The present application relates also to a polymer particle manufacturing apparatus to be used for the manufacturing method described above.

FIG. 3 is the diagram showing an example of the polymer particle manufacturing apparatus according to an embodiment of the present application.

As shown in FIG. 3, the polymer particle manufacturing apparatus 100 includes a mixer 10, crystallization unit 20, a pipe 30 and a heating unit 31.

The mixer 10 is an agitator or a mixer that agitates the first polymer solution including the first solvent and the polymer, and may include a tank 11 or a reservoir, which contains the first polymer solution, and a first agitating unit 12 disposed inside the tank or the reservoir to mechanically agitate the first polymer solution. In one example, the mixer may be a tank type mixer or a rocking type mixer, and the first agitating unit may have one or more blades that perform agitation. For the manufacturing apparatus of the present application, various types of agitators may be used, such as a propeller type, an oar type, a turbine type, a spiral type, as categorized depending on the shape of the blades, and most preferably, the propeller type agitator may be used.

The crystallization unit 20 is a unit in which polymer particles are crystallized, and the crystallization unit 20 may be filled with a second solvent which has compatibility with the first solvent. For example, the first polymer solution may flow into the crystallization unit 20 from the mixer 10 through the pipe 30 that will be described below, and the second solvent charged in the crystallization unit 20 may be mixed with the first polymer solution. As such, the mixture solution of the first polymer solution and the second solvent is formed, and as the crystallization occurs inside the crystallization unit, nuclei are formed and crystals can grow from the nuclei. As for the crystallization unit, any unit that is able to induce the crystallization can be used, and for example, it may be a semi-batch crystallization unit as shown in FIG. 3. However, the embodiments of the present application are not limited only to the types of crystallization units cited above.

In one example, the mixer 10 and the crystallization unit may be connected by the pipe 30. The first polymer solution mixed in the mixer 10 may flow into the crystallization unit 20 through the pipe 30.

Also, the heating unit 31 is provided at the pipe, and may heat the first polymer solution flowing through the pipe 30 up to or above the melting point of the polymer. As for the heating unit 31, any heating unit known in the related art may be used so long as it is capable of heating the first polymer solution, and for example, it may be a heating coil or a coil in which steam or warm water flows, but is not limited thereto.

The manufacturing apparatus 100 according to another embodiment in the present application may further include a pump 32. The pump 32 may be provided at the pipe 30 between the mixer 10 and the crystallization unit 20, and transport the first polymer solution from the mixer 10 to the crystallization unit 20. As for the pump, it may be any device that is able to create the pressure difference required for transportation of the first polymer solution to the crystallization unit 20. For example, the pump may be a gear pump, a diaphragm pump, a plunger pump, or a syringe pump. However, the embodiments of the present application are not limited to the types of crystallization unit cited above.

Also, in another example, although not illustrated, the manufacturing apparatus 100 may further include a cooling unit that cools the temperature inside the crystallization unit 20 down to the range of $(T_b-35)°$ C. to $T_b°$ C., preferably $(T_b-30)°$ C. to $T_b°$ C., or more preferably $(T_b-30)°$ C. to $(T_b-5)°$ C. Here $T_b$ is defined as the boiling point (unit: ° C.) of the second solvent. As discussed above, by adjusting the temperature inside the crystallization unit 20 to the range cited above, it is possible to inhibit the formation of aggregates, improve the yield of polymer particles, and reduce the operating cost. For example, the cooling unit may cool the temperature of the second solvent which has compatibility with the first solvent filling the crystallization unit 20 down to and below the crystallization temperature of the polymer before the mixing process of the manufacturing method of the present application, and/or may cool the temperature of the mixture solution of the first polymer solution and second solvent down to and below the crystallization temperature of the polymer during or after the mixing process of the manufacturing method of the present application. The cooling unit may be installed inside or outside the crystallization unit, and for example, it may be a cooling jacket in which coolant is flowing, installed outside the crystallization unit, however, is not limited thereto.

Also, the manufacturing apparatus 100 of the present application may further include a second agitating unit 21 that agitates the first polymer solution and the second solvent inside the crystallization unit. In one example, the second agitating unit 21 may mix the second solvent which is cooled by the cooling unit, and the first polymer solution which is introduced into the crystallization unit 20.

The polymer particle manufacturing apparatus 100 is an apparatus in which the first polymer solution is agitated and heated to or above the melting point of the polymer, the heated first polymer solution is mixed with the second solvent and, the resulting mixture solution is crystallized to produce polymer particles.

More specifically, the polymer particles may be manufactured by the polymer particle manufacturing apparatus 100 as follows. First, a polymer is dissolved in the first solvent, and the resulting first polymer solution including the first solvent and the polymer dissolved in the first solvent, is agitated by the mixer 10, and then this first polymer solution is transported to the crystallization unit 20 by the pump 32 provided at the pipe 30. During the transportation, the first polymer solution may be heated to or above the melting point of the polymer by the heating unit 31 equipped at the pipe 30, and the heated first polymer solution may be transported into the crystallization unit 20, which is filled with the second solvent, through the pipe 30 that connects the mixer 10 and the crystallization unit 20. In the crystallization unit 20, the second solvent and the heated first polymer solution are mixed to produce a mixture solution. Also, although not illustrated, the second solvent filled in the crystallization unit or the mixture solution formed during the mixing process may be cooled down to or below the crystallization temperature by the cooling unit, and as such, the crystallization is induced.

For the manufacturing apparatus, the discussion relating to the types of polymer, first solvent, and second solvent is identical to what was previously discussed in the manufacturing method, therefore it will not be repeated.

The polymer particles manufactured by the manufacturing method and apparatus described in the present application may be applied in various industrial fields, and for example, they may be used in the manufacturing of a static bed for chromatography, a catalytic substrate, an adsorbent, or a separator.

Advantageous Effects

The present application relates to a manufacturing method for polymer particles, and according to the manufacturing method and apparatus described in the present application, a reduction in energy can be achieved by simplifying the manufacturing process.

MODES OF THE INVENTION

Hereinafter, the present application will be discussed in further detail with reference to examples according to the present application and comparative examples that are not in accordance with the present application, however, the scope of the present application is not to be limited by the examples set forth herein.

Experiment Example 1. Measurement of the Average Particle Diameter and Coefficient of Variation of the Manufactured Polyethylene Particle The scanning electron microscopy (SEM) photograph of polyethylene particles was analyzed using a digital image analysis program, Image Pro™ of Cybernetics Inc. Using this program, the diameters of polyethylene particles were individually measured, and the average diameter and the C.V. values of the polyethylene particles were obtained by calculating the average and the standard deviation from 1000 particles.

Example 1

Figure 3:
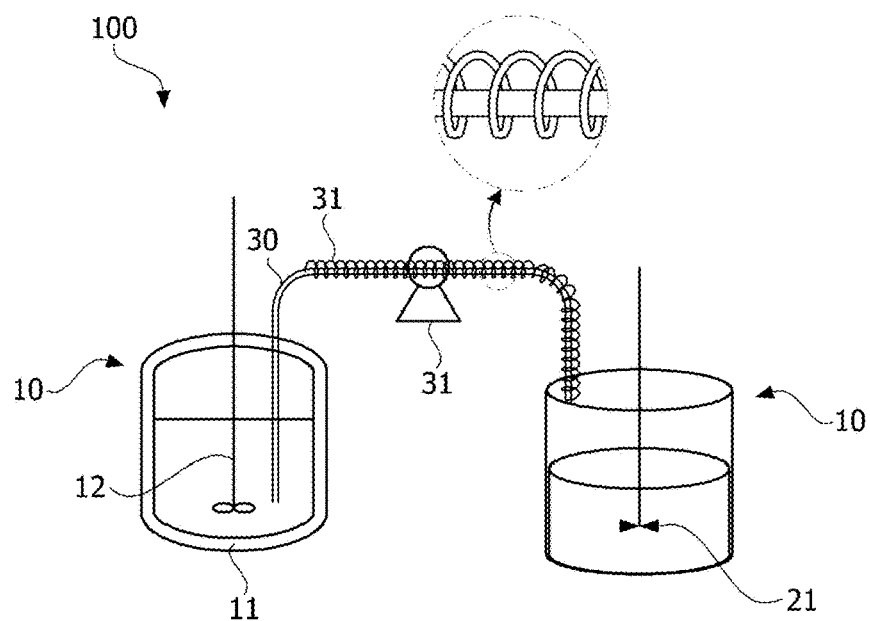
FIG. 3 is a diagram showing an example of a polymer particle manufacturing apparatus according to an embodiment of the present application.

In the mixer of the polymer manufacturing apparatus as shown in FIG. 3, polyethylene manufactured via metallocene catalysis (the melting point around 115° C.) was added to the first solvent, dodecanol, such that the polyethylene content of the mixture would be 1 weight % with respect to the total weight of the mixture, was mixed to produce a first polymer solution. The Hansen relative energy difference of the dodecanol with respect to polyethylene at room temperature is 1.32.

Figure 4:
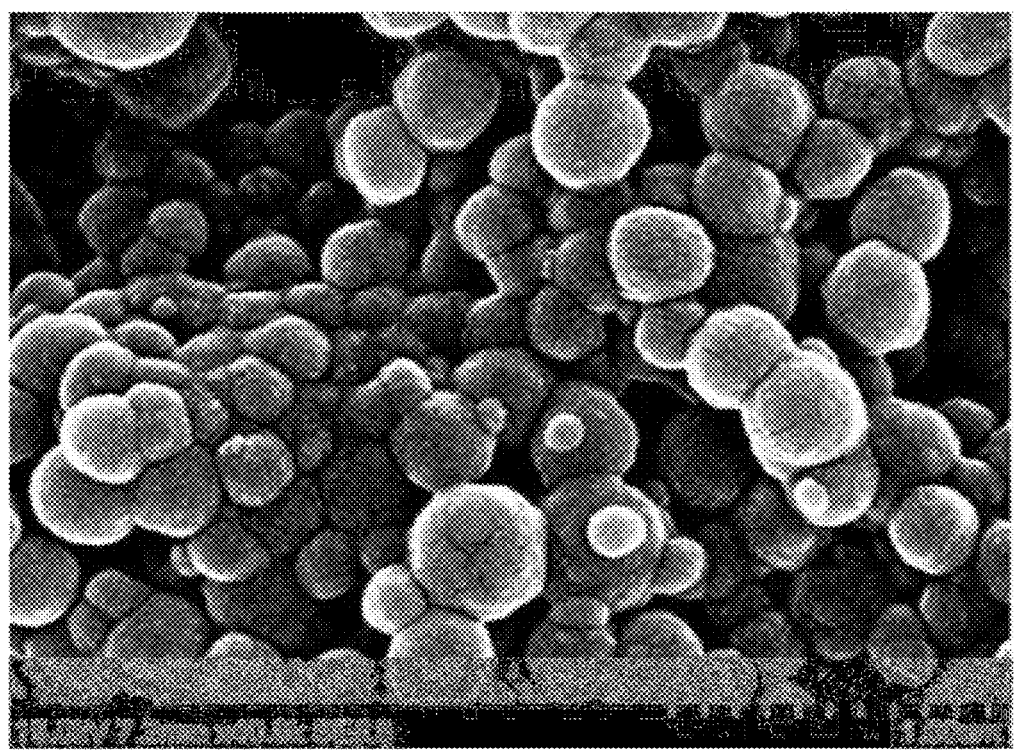
FIG. 4 is a SEM photograph of polyethylene particles manufactured in Example 1.

The mixture solution was prepared by continuously introducing the first polymer solution which was mixed in the mixer, into the crystallization unit in which the second solvent, ethanol (whose Hansen relative energy difference with respect to polyethylene at room temperature is 2.43) was filled while maintained at 72° C., and at the point of the introduction of the first polymer solution, the temperature was about 144° C. The mixture solution was then crystallized to produce polyethylene particles having the average diameter of 231 nm, the standard deviation therein of 90 nm, and the C.V. of about 39%. The manufactured polyethylene particles were examined using the SEM and the results are shown in FIG. 4.

Example 2

Figure 5:
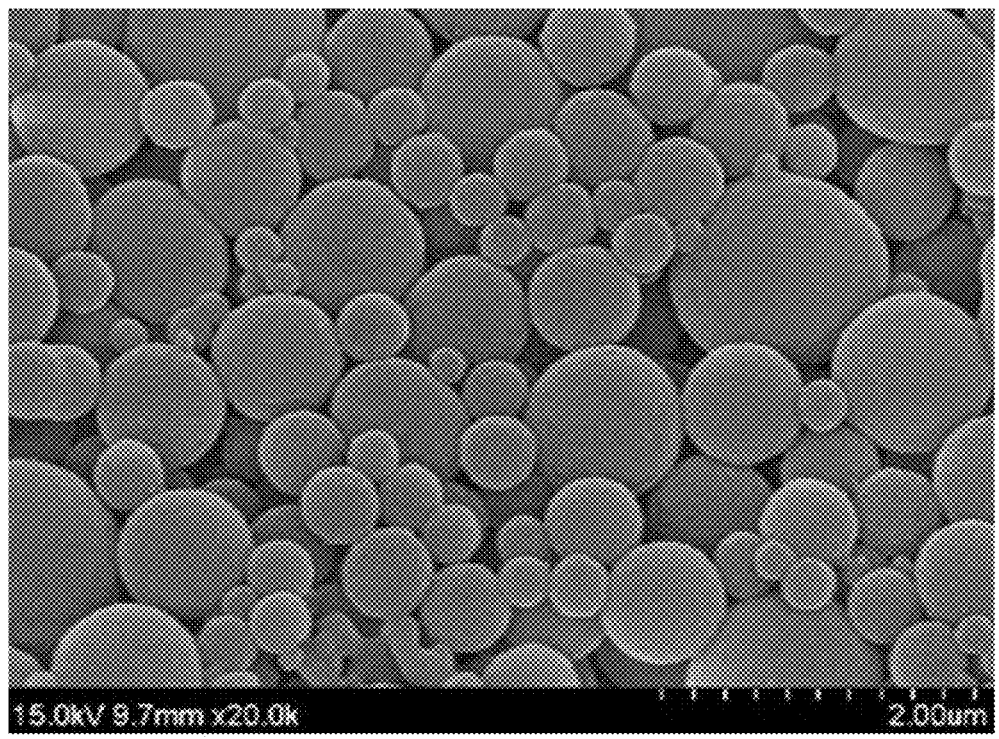
FIG. 5 is a SEM photograph of polyethylene particles manufactured in Example 2.

The method described in Example 1 was repeated, except that temperature of the mixture solution of the first polymer solution and the second solvent was adjusted to 77° C., to manufacture polyethylene particles having the average particle diameter of 584 nm, the standard deviation therein of 278 nm, and the C.V. of about 48%. The manufactured polyethylene particles were examined using the SEM, and the results are shown in FIG. 5.

Comparative Example 1

Figure 6:
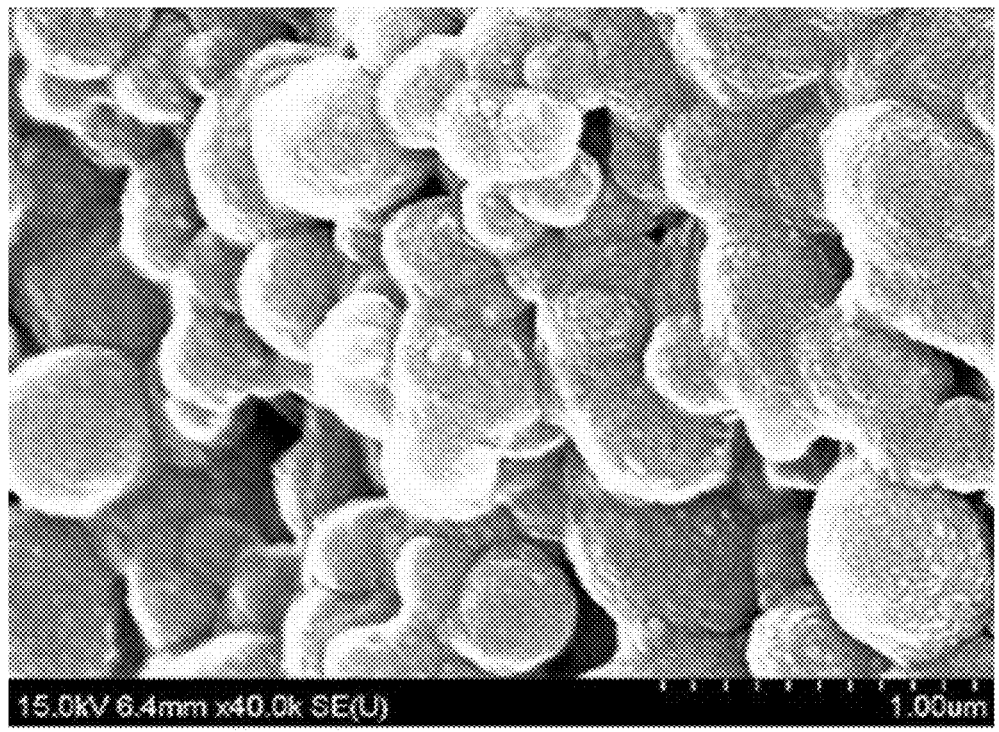
FIG. 6 is a SEM photograph of polyethylene particles manufactured in Comparative Example 1.

The method described in Example 1 was repeated, except that dodecanol (whose Hansen relative energy difference with respect to polyethylene at room temperature is 1.32) was used as the second solvent, to manufacture polyethylene particles having the average particle diameter of 478 nm, the standard deviation therein of 403 nm, and the C.V. of about 84%. In this case, the temperature of the mixture solution was adjusted to 72° C. by a cooling device. The manufactured polyethylene particles were examined using the SEM, and the results are shown in FIG. 6.

Comparative Example 2

Figure 7:
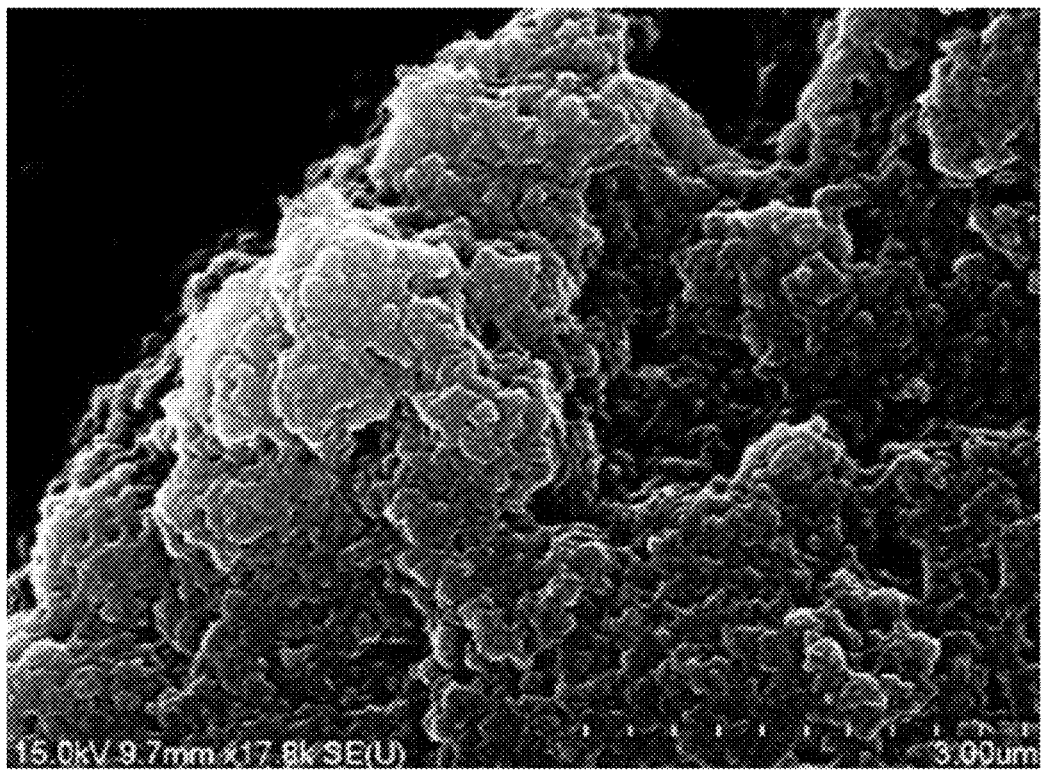
FIG. 7 is a SEM photograph of polyethylene particles manufactured in Comparative Example 2.

The method described in Example 1 was repeated, except that the temperature of the mixture solution of the first polymer solution and second solvent was adjusted to 28° C., to manufacture polyethylene particles. The manufactured polyethylene particles were examined using the SEM, and the results are shown in FIG. 7.

Comparative Example 3

The method described in Comparative Example 1 was repeated, except that the temperature of the mixture solution of the first polymer solution and the second solvent was adjusted to 28° C., to manufacture polyethylene particles. The manufactured polyethylene particles were examined using the SEM, and the results are shown in FIG. 8.

Comparative Example 4

The method described in Example 1 was repeated, except that water (whose Hansen relative energy difference with respect to polyethylene at room temperature is 5.5) was used as the second solvent (the temperature of water was maintained at 72° C. before the mixing, and at about 144° C. at the point of introduction of the first polymer solution, and the temperature of the mixture solution of the first polymer solution and the second solvent was 72° C.) to manufacture polyethylene particles. The manufactured polyethylene particles were examined using the SEM, and the results are shown in FIG. 9.

Figure 8:
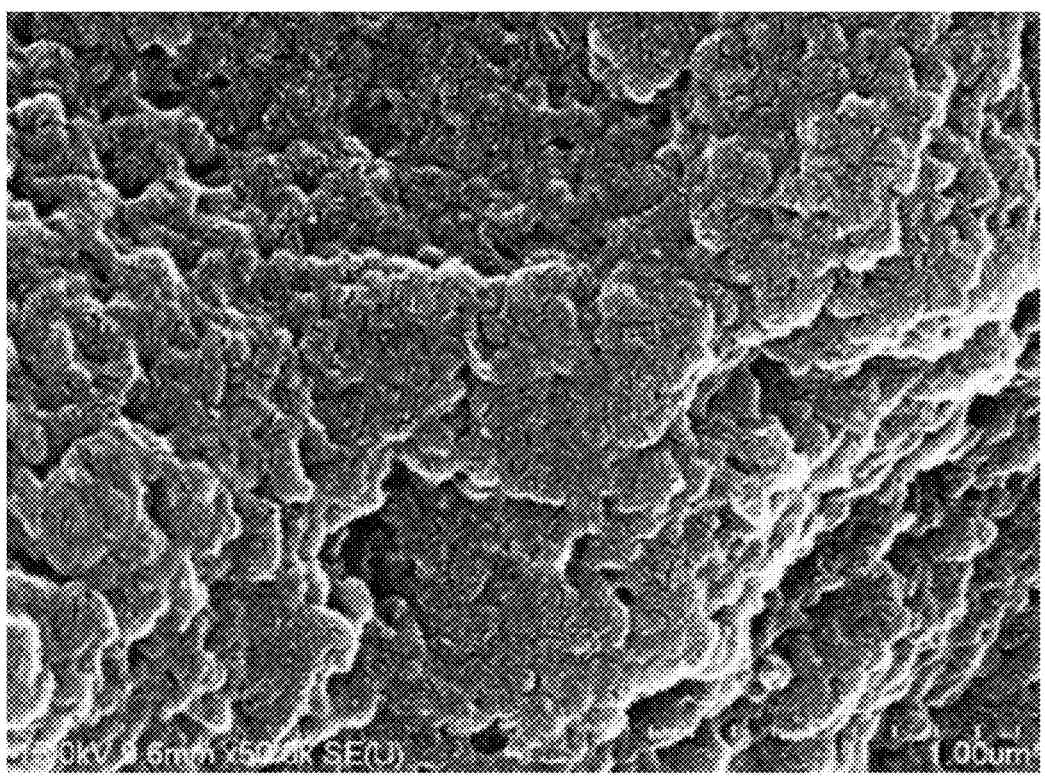
FIG. 8 is a SEM photograph of polyethylene particles manufactured in Comparative Example 3.

According to an embodiment of the manufacturing method for polymer particles of the present application, as can be seen in FIG. 4 to FIG. 8, polyethylene particles can be manufactured without forming an emulsion, and especially, as shown in FIG. 4 and FIG. 5, polyethylene particles having the relatively uniform spherical form can be efficiently manufactured, such as the ones in Example 1 and 2. On the other hand, as in Comparative Example 1 where the second solvent was a monovalent alcohol with large carbon numbers, it was unable to manufacture polyethylene particles having the relatively uniform spherical form, and as in Comparative Examples 2 and 3 where the temperature of the mixture solution of the first polymer solution and the second solvent was lowered, aggregates of polyethylene particles were formed, as can be seen in FIG. 7 and FIG. 8.

Figure 9:
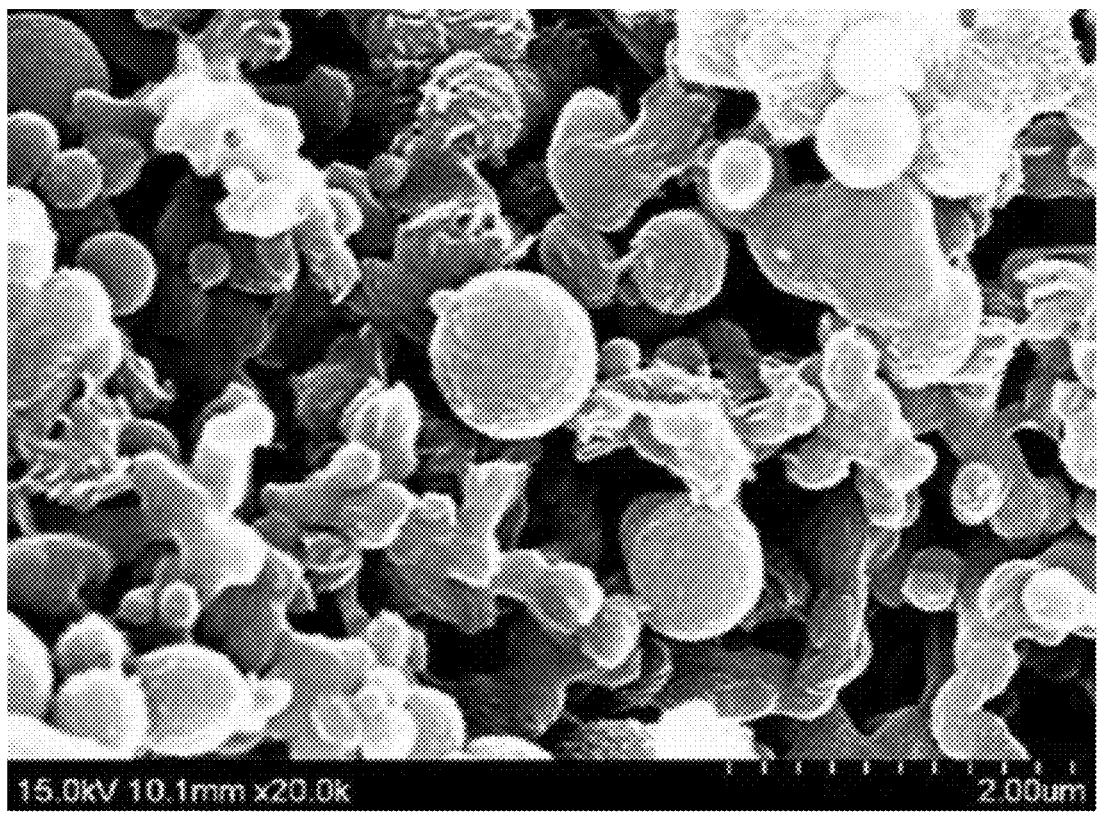
FIG. 9 is a SEM photograph of polyethylene particles manufactured in Comparative Example 4.

When water, instead of a polyalcohol, was used as the second solvent, an emulsion was formed due to the difference in polarity between water and dodecanol, and it can be seen from FIG. 9 that the generation of individual spherical particles was hindered.

Comparative Example 5

Figure 1:
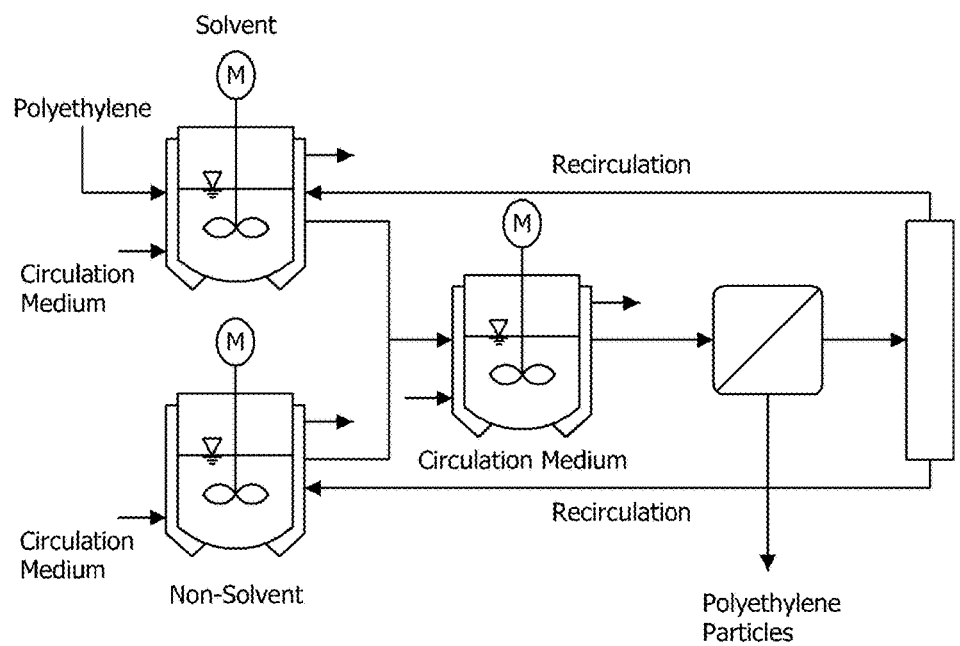
FIG. 1 is a diagram showing an apparatus conventionally used for manufacturing a polymer particle.
Figure 2:
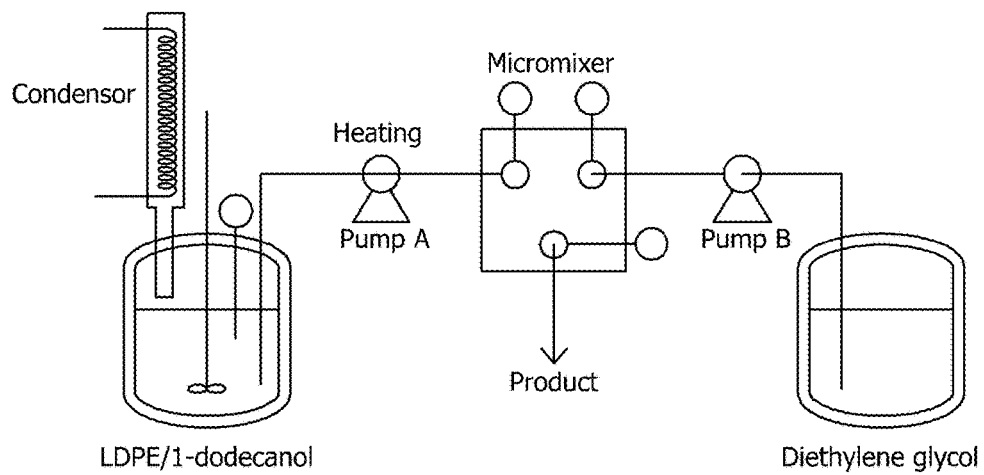
FIG. 2 is a diagram showing another apparatus conventionally used for manufacturing a polymer particle.

In a dissolution device of the polymer particle manufacturing apparatus as shown in FIG. 1, polyethylene manufactured via metallocene catalysis was added to the first solvent dodecanol (whose Hansen relative energy difference with respect to polyethylene at room temperature is 1.32) so that the polyethylene content would be 1 weight % with respect to the total weight of the mixture, and the polyethylene was dissolved at about 144° C. until the polyethylene was completely dissolved.

Diethylene glycol (whose Hansen relative energy difference with respect to polyethylene at room temperature is 2.87) which was maintained in a non-solvent heating unit at the same temperature as the above, was transported into a crystallization unit equipped with an agitator, and the dissolved polymer solution was introduced at the volume ratio of 1:4. The mixture of diethylene glycol and the polymer solution was then agitated at 400 RPM and cooled down to 72° C. During the cooling process, water and dodecanol were phase-separated, resulting in the formation of an opaque emulsion. After the cooling, polyethylene was obtained by filtering the crystal solution in a filtration device. The obtained polyethylene was then washed twice using hexane, twice using ethanol and dried. According to the examination by SEM on the polyethylene particles manufactured above, it was unable to measure the average diameter of the particles due to the formation of aggregates in the polymer particles.

DESCRIPTION OF REFERENCE NUMERALS

100: Polymer Particle Manufacturing Apparatus
10: Mixer
11: Tank
12: First Agitating Unit
20: Crystallization Unit
21: Second Agitating Unit
22: Cooling Unit
30: Pipe
31: Heating Unit
32: Pump

The invention claimed is:

1. A polymer particle manufacturing method, comprising:
manufacturing a first polymer solution including a polymer dissolved in a first solvent;
heating a manufactured first polymer solution to $(T_m+5)$ ° C. or above, wherein $T_m$ is a melting point (° C.) of the polymer; and
mixing a second solvent with a heated first polymer solution,
wherein the temperature of the second solvent to be mixed with the first polymer solution is adjusted to at or below a crystallization temperature of the polymer, and
wherein the crystallization temperature of the polymer is lower than the $T_m$, and
wherein a mixture solution of the first polymer solution and the second solvent is a non-emulsion.

2. The polymer particle manufacturing method of claim 1, wherein the first solvent is a good solvent with respect to the polymer.

3. The polymer particle manufacturing method of claim 1, wherein the first solvent has a Hansen relative energy difference of 0.6 or more and less than 2, with respect to the polymer at room temperature.

4. The polymer particle manufacturing method of claim 1, wherein the first solvent is a monovalent alcohol having 6 or more carbons.

5. The polymer particle manufacturing method of claim 1, wherein the second solvent has a Hansen relative energy difference of more than 2 and less than 5 with respect to the polymer at room temperature.

6. The polymer particle manufacturing method of claim 1, wherein the second solvent is a monovalent alcohol having 5 or less carbons, or ketone.

7. The polymer particle manufacturing method of claim 1, wherein the first solvent is a monovalent alcohol and the second solvent is a monovalent alcohol or ketone.

8. The polymer particle manufacturing method of claim 1, wherein the polymer is a polyolefin.

9. The polymer particle manufacturing method of claim 1, wherein the temperature of the second solvent to be mixed with the first polymer solution is adjusted to a range of $(T_b-70)$ ° C. to $T_b$° C., wherein $T_b$ is a boiling point (° C.) of the second solvent.

10. The polymer particle manufacturing method of claim 1, further comprising adjusting a temperature of the mixture solution of the first polymer solution and the second solvent to a range of $(T_b-35)$ ° C. to $T_b$° C., wherein $T_b$ is a boiling point (° C.) of the second solvent.

11. The polymer particle manufacturing method of claim 1, further comprising cooling the mixture solution of the first polymer solution and the second solvent.

* * * * *